J. DAY.
Making Brooms.
No. 2,495. Reissued Feb. 26, 1867.
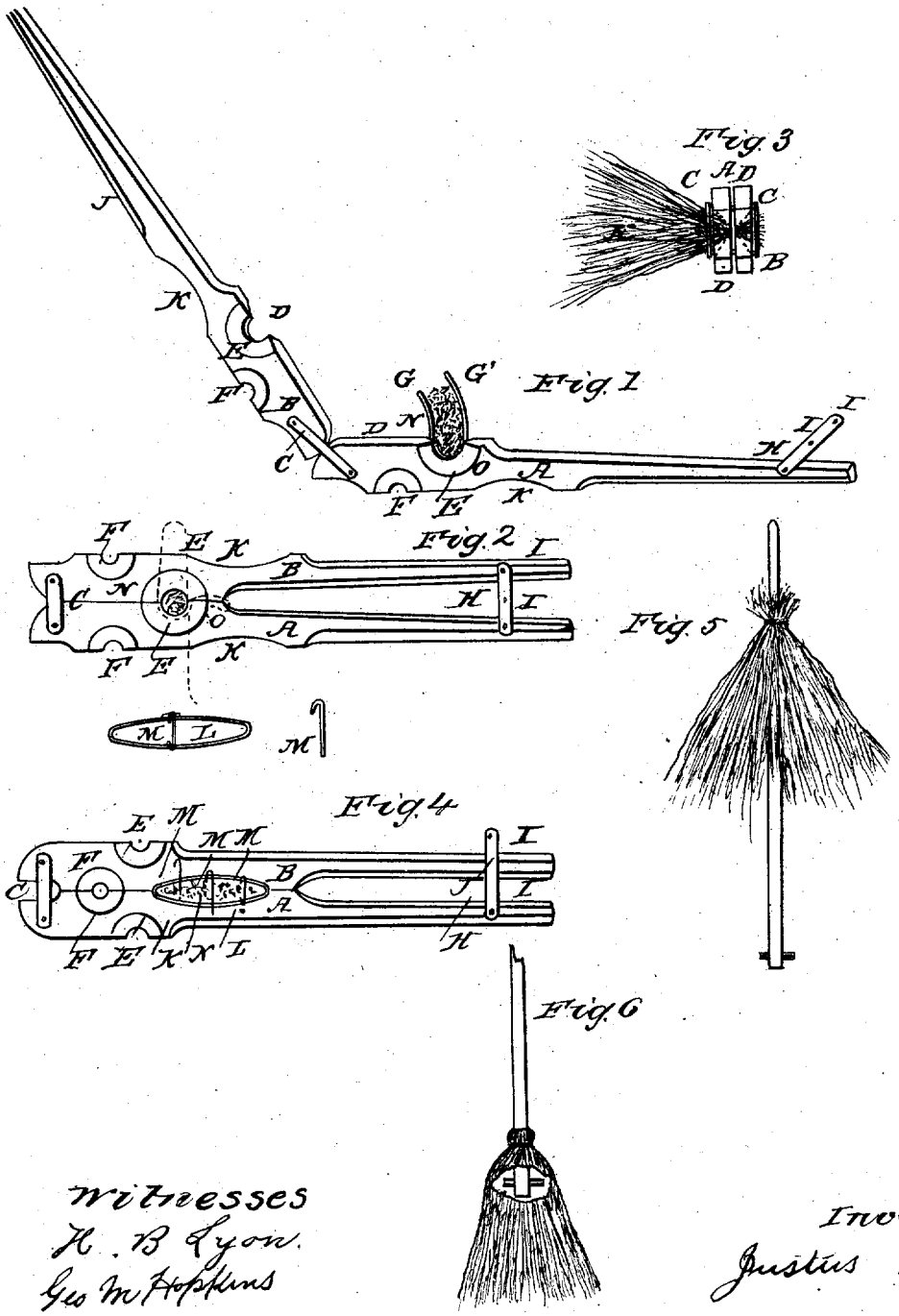
Witnesses
H. B. Lyon.
Geo M. Hopkins
Inventor
Justus Day
N. PETERS, Photo-Lithographer, Washington, D. C.

United States Patent Office.

JUSTUS DAY, OF MURRAY, NEW YORK.

*Letters Patent No.* 59,977, *dated November* 27, 1866; *reissue No.* 2,495, *dated February* 26, 1867.

IMPROVED CLAMP FOR MAKING BROOMS.

The Schedule referred to in these Letters Patent and making part of the same.

TO ALL WHOM IT MAY CONCERN:

Be it known that I, JUSTUS DAY, of Murray, in the county of Orleans, and State of New York, did invent a new and useful improvement in Clamps for Making Brooms, for which Letters Patent of the United States were granted me November 27, 1866, (No. 59,977;) and I do hereby declare that the following is a full and exact description thereof, reference being had to the accompanying drawings, making part of this specification.

Figure 1 is a view of my improved clamp, as opened for the insertion of the broom-corn.

Figure 2, a view of the same, as closed to compress the corn for winding.

Figure 3, an end view, showing more particularly the slot for admitting the wire in winding.

Figure 4, a view, showing the device as closed for flattening the broom and applying the binder.

Figure 5, a view, showing the broom as removed after winding, and with the handle partially inserted.

Figure 6, a view of the broom complete, with a portion broken away to show the position of the handle.

Like letters of reference indicate corresponding parts in all the figures.

My improvements have relation to an improved instrument for compressing and holding the broom-corn while it is being wound with wire at the top, and for flattening the same for the application of the binding or bracing wire, as hereinafter described.

As represented in the drawings, the clamp is composed of two parts, A, B, which are preferably in the form of levers, connected together at the front end by a link or strap, C, which forms the fulcrum, and allows a free opening of the parts, and at the rear end by a catch, H, or its equivalent, which holds the clamp closed in either position. The clamp is provided with one or more sockets, E or F, of round form, preferably chamfered or bevelled to the centre, as shown, of such size as to compress the requisite amount of broom-corn therein to form a single broom when the device is closed. It is also provided with one or more elongated or oval sockets, K, for flattening the broom in applying the binder, as hereinafter described. At a suitable position the clamp is provided with one or more slots, D, extending longitudinally and surrounding the socket or sockets E F, so that when the broom stuff is clamped in place, the slot or slots will allow the passage and winding of wire around said broom stuff, as will be directly explained.

In operation, I employ two pieces of wire or rod, G G′, inserted loosely in the slot D each side of the socket E, and between these is placed the broom stuff, as indicated in fig. 1. When the clamp is closed the broom stuff will be compressed within the socket, as in fig. 2, and the wires or rods are then drawn out. When this is accomplished the broom is in condition to be wired. The wire is fastened at one end at a suitable position, as at *o*, and is then passed into the slot D, as indicated in dotted lines, and is then passed around and around the broom stuff a number of times, and finally the loose end is passed out, when it is cut off and the two ends are then twisted tightly together. This completes the binding of the upper end of the broom head. The great advantage of the employment of the slot D in connection with the compressing socket E of the clamp will be readily appreciated. By its use the wire is applied on a line with the slot, and just at that point where the broom stuff is compressed to the greatest degree instead of above or below the clamp, and therefore a greater degree of compactness is insured than would otherwise be the case. The slot, by extending past or around the socket each side, allows the wire to be passed around the broom-corn without obstruction or difficulty. When the upper end of the broom head is thus firmly wound, the handle is inserted, as shown in fig. 5, and drawn into position, as shown in fig. 6. The insertion of the handle compresses the wound corn still more closely, so that there is no danger of its becoming detached. The broom is now in shape to be flattened for the applying of the binder or clasp. To accomplish the flattening, the broom is placed in the socket K, and the clamp closed upon it, as shown in fig. 4. The binder consists of an elongated or oval loop of wire, L, which passes around the flattened portion of the broom. The opposite sides of this binder are connected by short hasps or connections, M, passed through the broom, as shown in fig. 4, and bent over the binder to hold it in place and stiffen it. When this is accomplished the broom is complete except in the matter of trimming. The combining of the round and the oval sockets E K in the same clamp embodies the device in the simplest form, and enables me to produce a broom without changing from one instrument to another, by which a great saving of time is effected. I am aware of no other device in which these sockets of different forms are combined. The employment of the rods G G′, as described, not only serves to centre and guide the broom stuff, but also striking into the slot D of each side of the clamp, keeps the said sides on a line and in proper position as they close, so that the slot in the respective sides cannot be displaced. By being placed loosely in the slot they are also readily removable when the clamp is closed, so as to be out of the way.

What I claim as my invention, and desire to secure by Letters Patent, is—

1. In a clamp for forming brooms, the combination of the slot D with the socket E, for facilitating the winding of the broom head, as herein set forth.

2. The combination of the loose rods or wires G G′ with the slot D and socket E, operating in the manner and for the purpose set forth.

3. A clamp for forming broom heads, combining a round socket or sockets, E, for winding the top of the broom, and an elongated socket or sockets, K, for binding it, as set forth.

4. The arrangement as a whole, consisting of the clamp A B, sockets E K, slot D, and wires G G′, operating in the manner and for the purpose herein set forth.

5. The construction of a broom clamp, the levers A B of which are pivoted at their fulcra by means of the link or links C, so as to be capable, by reversing, of bringing the sockets E and F successively into use, as set forth.

6. In combination with the slot D, the bevelled form of the sockets E F, whereby the fibres of the material are brought gradually to the greatest degree of compression at the point where they are wound, as shown.

7. In combination with the reversible levers A B, provided with sockets on their opposite faces, I claim the adjustable catch H, for holding them together in either position while the broom is being wound, as shown and described.

In witness whereof I have hereunto set my hand in presence of two subscribing witnesses.

JUSTUS DAY.

Witnesses:

R. F. Osgood,

David Webster.